No. 781,720. PATENTED FEB. 7, 1905.
E. H. GOLD.
CAR HEATING SYSTEM.
APPLICATION FILED APR. 16, 1903.

Witnesses:
Inventor:
E. H. Gold.
By Raymond & Barnett
Attys.

No. 781,720. PATENTED FEB. 7, 1905.
E. H. GOLD.
CAR HEATING SYSTEM.
APPLICATION FILED APR. 16, 1903.

No. 781,720. PATENTED FEB. 7, 1905.
E. H. GOLD.
CAR HEATING SYSTEM.
APPLICATION FILED APR. 16, 1903.

Witnesses
JB Weir
Edward L. Eiopeldt

Inventor
Egbert H. Gold,
by Raymond H. Barnett
Attys

No. 781,720. PATENTED FEB. 7, 1905.
E. H. GOLD.
CAR HEATING SYSTEM.
APPLICATION FILED APR. 16, 1903.

Witnesses:
JB Weir
Edward C. Eisfeld

Inventor:
Egbert H. Gold
by Raymond & Bennett
Attys.

No. 781,720. PATENTED FEB. 7, 1905.
E. H. GOLD.
CAR HEATING SYSTEM.
APPLICATION FILED APR. 16, 1903.

Witnesses
Inventor:
Egbert H. Gold
by Raymond & Barnett
Attys

No. 781,720. Patented February 7, 1905.

UNITED STATES PATENT OFFICE.

EGBERT H. GOLD, OF CHICAGO, ILLINOIS.

CAR-HEATING SYSTEM.

SPECIFICATION forming part of Letters Patent No. 781,720, dated February 7, 1905.

Application filed April 16, 1903. Serial No. 152,932.

*To all whom it may concern:*

Be it known that I, EGBERT H. GOLD, a citizen of the United States, residing at Chicago, in the county of Cook and State of Illinois, have invented certain new and useful Improvements in Car-Heating Systems, of which the following is a specification.

My invention relates more especially to improvements in systems of heating railway-cars by means of steam supplied to the cars from the locomotive by means of a train-pipe extending through the train and having branch connections with each car.

Among the objects of my invention are the rapid heating of a train when first connected with a locomotive, the constant and even heating thereof, the substantially simultaneous heating of all the cars in a train, prevention of the waste of steam, prevention of the accumulation of the water of condensation in the train-pipe, and prevention of the freezing of the train-pipe at any point throughout its length, and especially at the valves which are arranged in the train-pipe at each end of each car and in the flexible hose-sections which form the connecting-links in the train-pipe between the cars.

Another object of my invention is to provide convenient control of the train-pipe end valve from the platform of the car.

One of the recognized rules in the railway service is that in cold weather a train shall not leave a station until steam appears at the extreme rear end of the train-pipe, so as to show that the train-pipe is not frozen or otherwise obstructed anywhere throughout its length. With heating systems as ordinarily constructed the connections between the radiating systems of each car and the train-pipe, which constitutes the feeder for the entire train, are such that the lateral pipes branching from the train-pipe at each car are quite equal in their combined capacity to the capacity of the train-pipe, so that when steam is first let into the train-pipe it will find its way to the first car and will thence pass into the laterals and will not proceed with any force beyond that point in the train-pipe until the radiator system of that car is fully supplied with steam, whereupon the steam will pass on to the next car, and so on until the radiating systems of the entire train shall have been filled with steam. One result of this is that with a long train there is often a very considerable delay before the steam reaches the end of the train and escapes through the valve opened at the extreme end of the train-pipe, and the train is meanwhile held in obedience with the rule before noted. Another result of this is that the cars will be heated in succession, thus delaying the heating of the rear cars of the train until long after the first cars have been heated and even overheated, while any fall in the pressure of the steam will result in cooling the rear cars first.

It is recognized in this art that in order to provide for such an escape of the water of condensation from the train-pipe as shall prevent its accumulation and freezing in the train-pipe there should be a constant bleeding or discharge of steam from the extreme end of the train-pipe at the rear end of the train. A very slight bleeding will be sufficient for this purpose; but much trouble has been experienced in providing some simple and effective means which shall accomplish this result under practical conditions of train service. For instance, with a globe-valve, such as is ordinarily used with train-pipes, the valve will be left open until steam appears at the end of the train-pipe. Thereupon the valve will be sufficiently closed to allow only a slight escape of steam between the valve and its seat, the operative judging as to this adjustment as best he can at the time. Naturally when the steam first reaches the end of the train-pipe it is at a very low pressure. As the train gets under way and the cars become heated and the heating system of the train is filled with steam at full pressure the steam will reach full pressure at the extreme end of the train-pipe, with the result that an opening which was sufficient to allow only a slight bleeding of steam at a pressure of two or three pounds is sufficiently large to allow a very wasteful discharge of steam at a pressure of forty or fifty pounds, and where this happens on through trains, which frequently make extended runs without stops, this condition cannot be corrected without stopping the train, and so this waste of steam continues until the next stopping-point is reached. Again, if the train-pipe valve at the front end of a car shall be accidentally or prematurely closed it will prevent steam from entering that car, with the result that the water of condensation in the train-pipe forward of the closed point will accumulate in the coupling between the cars. When for any purpose it becomes necessary to uncouple the cars, the flexible coupling-section will feel cold to the touch, being full of water of condensation, if, indeed, it will not be frozen. In the former case the yard-hand whose duty it is to uncouple the car, and who in the haste of switching cars does not have time to make nice and careful examinations, may hastily uncouple the train-pipe at this point, with the result that the steam-pressure will blow the accumulated water of condensation out of the uncoupled section of pipe, and there will be an immediate and free discharge of steam from the wide-open train-pipe and a rapid fall in steam-pressure throughout the train forward of that point and great danger of seriously scalding the employee who uncoupled the train-pipe.

It is therefore another object of my invention to so construct my system that it is impossible for the train-pipe to be closed at the forward end of any car, and consequently to prevent the possibilities above noted.

Again, it will be borne in mine that in cold weather, and especially in very cold latitudes, there will be a constant condensation within the exposed train-pipe, which extends without protection under the rapidly-moving train, and a like condensation in the lateral feeders, which extend from the train-pipe under the car and thence up into the car to the radiating system. Consequently such lateral pipes must be of such capacity that they cannot be obstructed by the freezing of the water of condensation, which in service will trickle down their inner sides, as would happen with steam-pipes of small capacity located in such an exposed position.

Another object is to provide a clear passage for steam throughout the entire length of the train-pipe unobstructed and unthrottled either by the end valves, feed-pipe coupling, or otherwise.

These and such other objects as may hereinafter appear are attained by the devices shown in the accompanying drawings, in which—

Fig. 1½ shows in section the end valve at the rear end of one car and the end valve at the front end of the next car behind and the connections between said valves. Fig. 5½ is a cross-sectional detail on the line 5½ of Fig. 5 looking in the direction indicated by the arrows.

Like characters of reference indicate the same parts in the several figures of the drawings.

Figure 1:
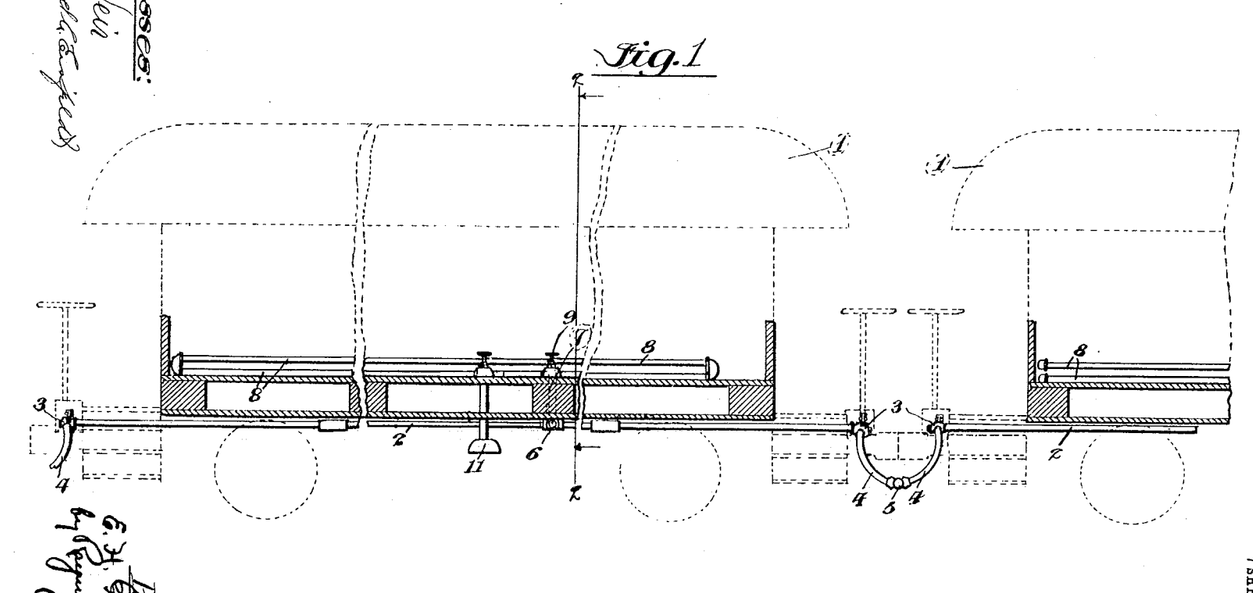
Figure 1 is a longitudinal central section through a train fitted with my improved heating system.
Figure 2:
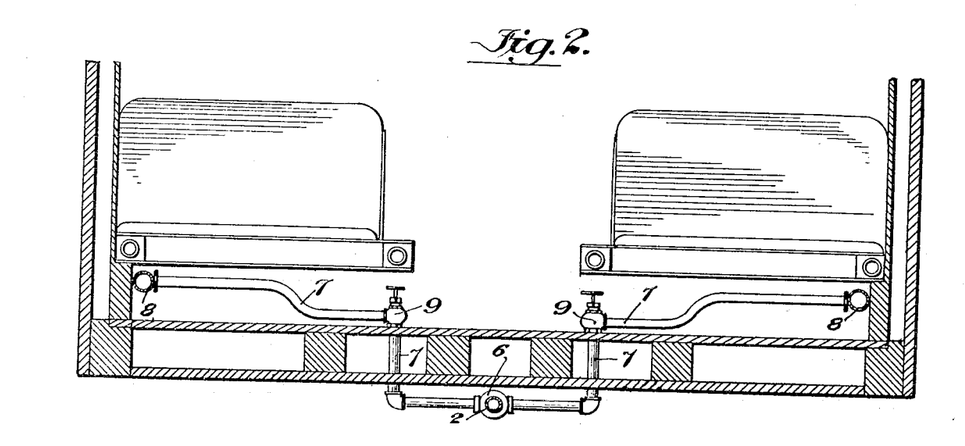
Fig. 2 is a cross-section on the line 2 2 of Fig. 1.
Figure 3:
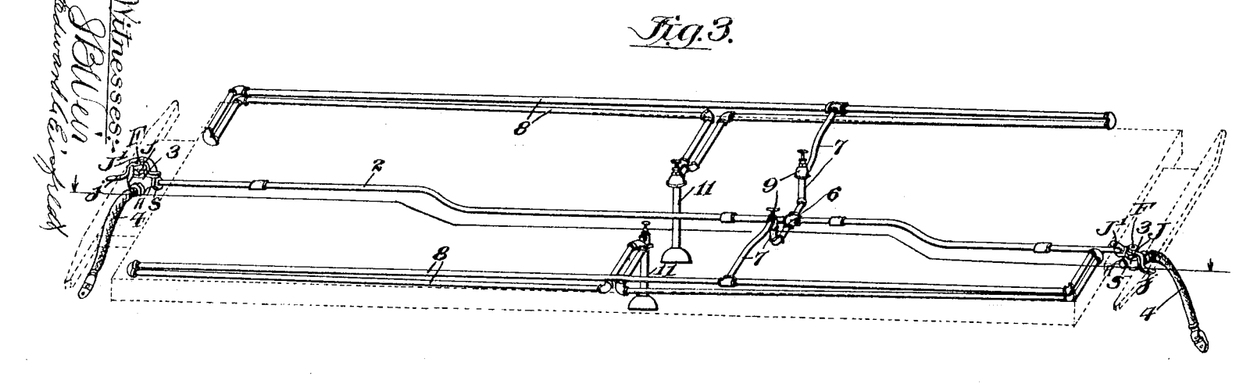
Fig. 3 is a diagrammatic view of the floor of a car fitted with my system.
Figure 6:
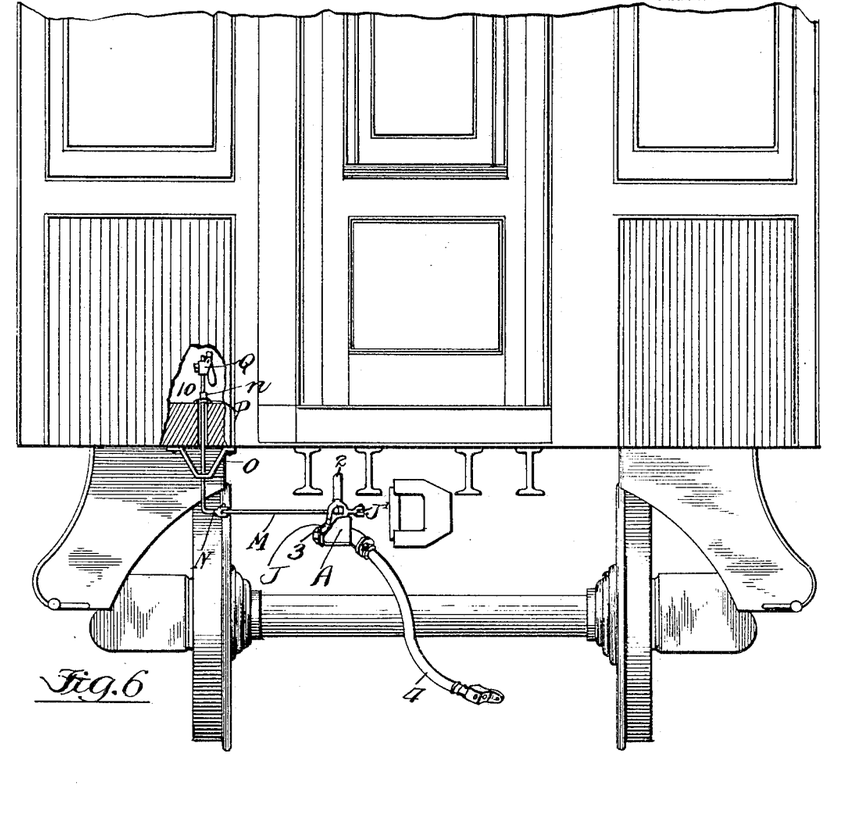
Fig. 6 is an end view of a car fitted with my improvements.
Figure 7:
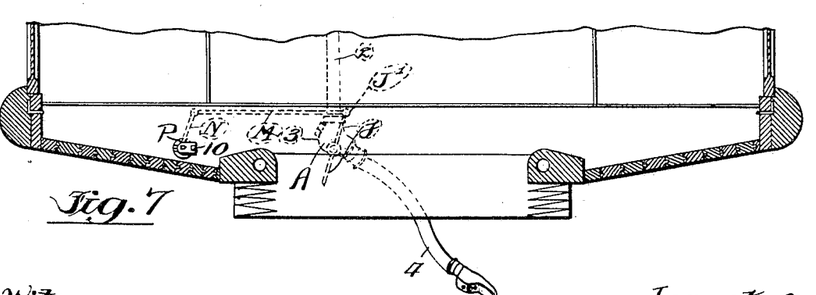
Fig. 7 is a sectional plan view of the construction in Fig. 6.
Figure 8:
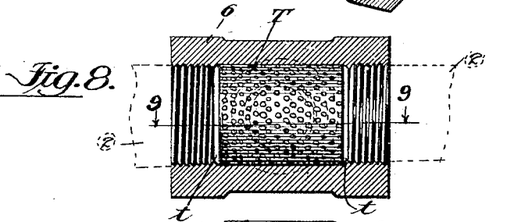
Fig. 8 is a sectional plan view of my improved strainer-cross.

The distinctive features of my improved system comprise the combination, with the train-pipe and the heating system in the cars, of my improved train-pipe valves, strainer-cross or T, supply-valves, and train-pipe-valve platform-operating device, all coöperating to maintain a steady and uniform supply of steam throughout the train at all times, whereby the train will be continuously and uniformly heated without waste of steam, without undue delay, and without accummulation of water or obstruction of the pipes by freezing. The foregoing results are attained by the following devices:

1 is a car, beneath which extends the train-pipe 2, which conveys steam from the engine to the car in the well-known manner. At each end of each car the train-pipe is provided with an end valve 3 for controlling the passage of steam out of the car. Connected with the end valves 3 are flexible hose-sections 4, which extend between the ends of each car and are connected in the usual manner by couplings 5, thus completing the connections between the train-pipes of two adjacent cars. Interposed in the train-pipe between the ends of the car is a cross or T coupling 6, from which leads feed-pipe 7, arranged to conduct steam from the train-pipe to the radiator 8 within the car. Interposed between the coupling 6 and the radiator 8 and preferably mounted on the feed-pipe 7 are control-valves 9 for controlling the passage of steam from the feed-pipe 7 to the radiator 8. For convenient operation of the end valves there is preferably mounted upon the platform of each car an end-valve-operating device 10. (Vide Fig. 6.)

Broadly considered, the operation of the system so outlined is as follows: Steam from the locomotive is conducted by the train-pipe 2 through the flexible hose-sections 4 and hose-couplings 5 and end valves 3 to each car of the train, assuming that the end valve at the rear of each car, except the last car, is open. As the steam fills the train-pipe under each car it spreads laterally through the strainer-cross 6, feed-pipe 7, and valves 9 into the radiating system 8, and thus heats the car, the water of condensation escaping from the radiator system through the automatic trap 11. Steam may be shut off from any one or more of the cars by closing the end valve at the rear of the car immediately forward thereof, and the end valve at the rear end of each car may be opened or closed at will while the train is under way by means of the platform-operating device 10 either to admit steam to the cars behind it or to shut steam off or in case of the rear car to open the train-pipe to permit the discharge of water of condensation.

Figures 10, 11:
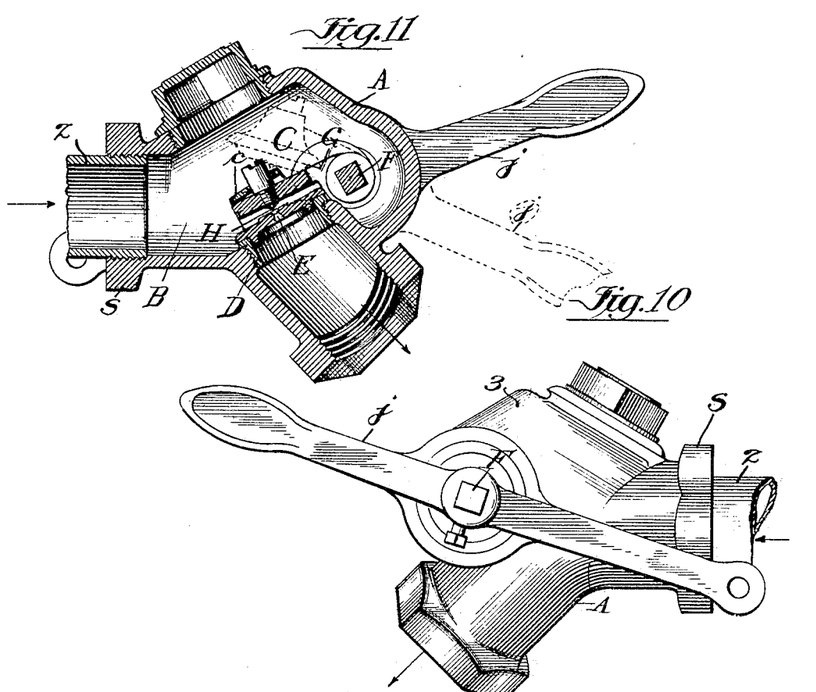
Fig. 10 is an elevation of my end valve.
Fig. 11 is a sectional view of the same.
Figure 12:
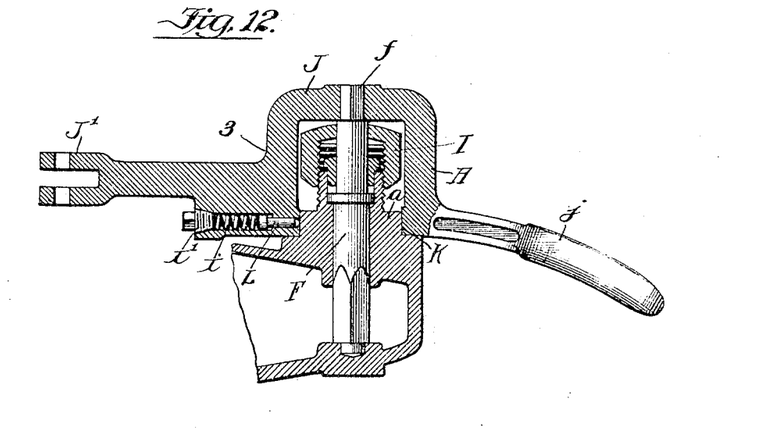
Fig. 12 is a detail of my end-valve-operating mechanism.

Coming now to the details of the construction of my apparatus, A, Figs. 10 et seq., is the casing of my improved end valve. Mounted within the valve-chamber B is a one-way valve C, arranged to be seated upon the main valve-seat D, so as to substantially close the steam passage-way through the valve-casing. The valve C is provided with a strap c and with a bleeding-port E. The valve-chamber B is provided at one side and at one side of the direct path of the steam travel with a recess, across which a spindle F extends. The spindle F has a polygonal portion upon which is mounted an arm G, which extends forwardly across the valve C and under the strap c, so as to have a lost-motion engagement with the valve C and strap c. This arm G is provided with a plug or pin H, the projecting end of which is adapted to serve as a valve to close the bleeding-port E. This projecting end of the pin H is preferably pointed in such a manner as to serve to clear the bleeding-port E whenever the bleeding-valve is closed by forcing through the bleeding-port E any matter which may have lodged therein. The connection between the arm G and the strap c may be completed by having the upper end of the pin H extend through a suitable opening therefor in the top of the strap c. The spindle F extends through the casing A and through a stuffing-box I. The projecting end of the spindle F is non-rotatively engaged by a yoke J, which is provided with a hand-lever j and may also be provided with a lever j''. The spindle F preferably has snug engagement with some portion of the structure, either with the stuffing-box or with the metallic parts against which it bears, so as to have a frictional engagement therewith which will tend to resist the rotation of the spindle F.

The operation of the valve as so far described is as follows: When it is desired to open the valve, the lever j or j'' is moved to the desired position, with the result that, first, the arm G is lifted, unseating the pin H from the bleeding-port E. Then as the arm G engages the strap c the main valve C is lifted and is thrown back into the recess at one side of the valve-chamber and at one side of the direct line of steam travel and at such an angle that the pressure of the current of steam in the valve-chamber B against the valve C will tend to hold it in extreme open position. Reversing the movement, the arm G is thrown forward until the pin H closes the bleeding-port E, whereupon the further movement of the lever will carry the main valve C to its seat, an operation which will be assisted by steam-pressure within the train-pipe as soon as the forward movement of the valve C has carried it slightly in advance of its extreme wide-open position. Therefore a partial closing of the valve C will be impossible. Now if it be desired to bleed the train-pipe slightly the lever j is moved a short distance, preferably so as to slightly unseat the valve C, whereupon the lever j is released, and the steam-pressure within the valve-chamber B will promptly return the valve C to its seat; but by reason of the frictional engagement between the spindle F and the structure and by reason also of the slight surface exposed to steam-pressure by the arm G and pin H the bleeding-port will remain open. If, as often happens, the water of condensation and escaping steam passing through the bleeding-port shall carry sediment, bits of rubber from the hose, or the like, into said bleeding-port, so as to obstruct the same, the next manipulation of the valve in a direction to close the bleeding-port will force the sharpened end of the pin H into the bleeding-port, so as to clear it of such obstructions, while at the same time closing said port. If the valve is located at the end of a train and the main valve is left slightly open when the train is starting, so as to insure a freer bleeding of the train-pipe than would be possible through the bleeding-valve when the pressure in the train-pipe is very low, as it is when the steam first reaches the rear end of the train-pipe, the main valve will remain open while the water of condensation and cold air are being forced out of the train-pipe by the steam-pressure behind; but as soon as the train-pipe is filled with steam of a higher pressure this higher pressure will automatically close the main valve. Consequently it will be impossible for a careless operator to so leave the main valve open before the train starts as to permit of a wasteful escape of steam therethrough after the steam within the train-pipe has risen to normal pressure.

Figure 13:
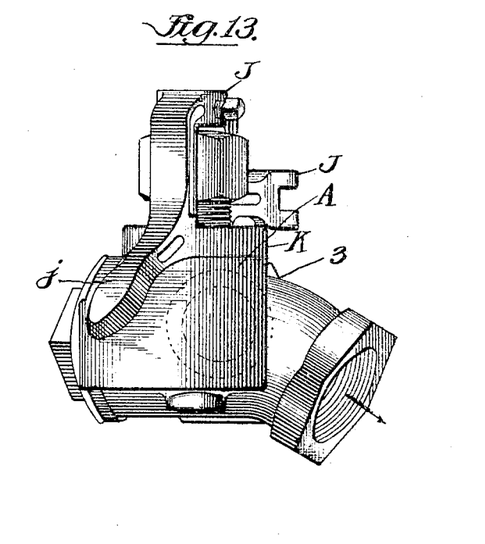
Fig. 13 is another elevation of the end valve.
Figure 14:
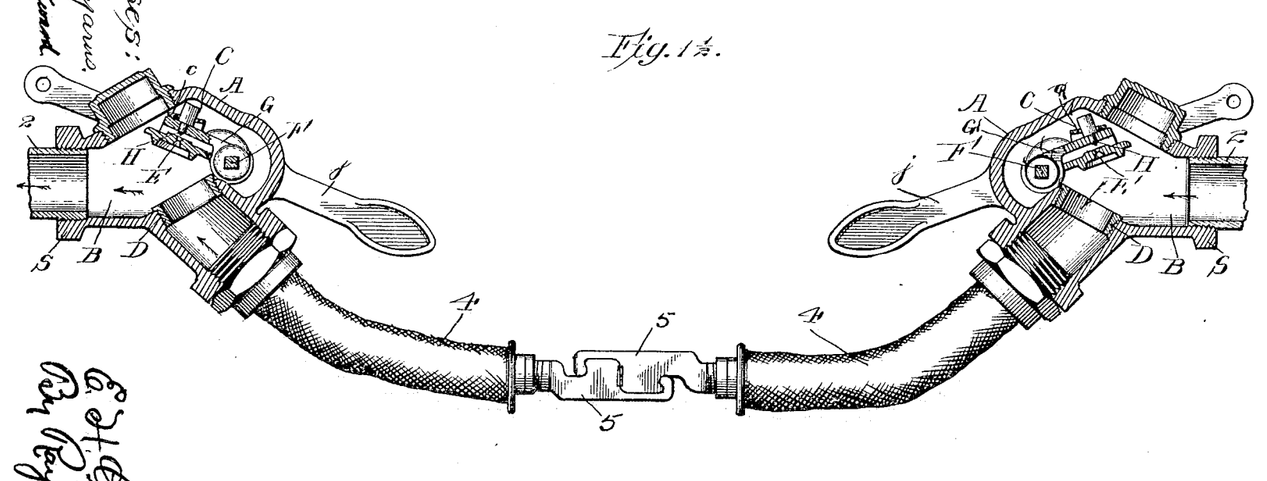

To strengthen the valve-operating mechanism, particularly handle j, from being readily jammed, displaced, or otherwise injured by the rough usage to which train apparatus is subjected, I provide the yoke J with an annular collar K, which is mounted upon a reduced cylindrical portion a of the casing A. Extending above this annular collar or base-ring K is the yoke J, which operatively engages the spindle F at its extreme end f.

To maintain the valve against accidental closure, I mount a pin L within a recess formed in an enlarged portion of the collar K, one end of said pin projecting inwardly from said recess and against the face of the cylindrical portion $a$ of the casing A and being yieldingly held in that position by a spring $l$, which is held in said recess and under compression against the head of the pin L by a plug $l'$, which is screwed into one end of said recess.

It will be observed that in the preferred construction, as shown in the drawings, the main steam-port through the valve-casing, which is adapted to be closed by the main valve, is so arranged that when the valve-casing is assembled with the train-pipe this port will be located below the longitudinal axis of the train-pipe, thereby insuring a continuous and automatic drainage of water of condensation, so that the pocketing and freezing of water within the valve-casing is thereby further prevented.

Figure 9:
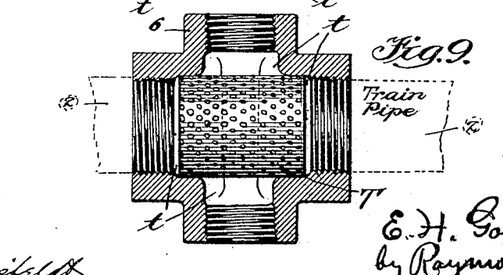
Fig. 9 is a longitudinal sectional view on the line 9 9 of Fig. 8.

For the purpose of connecting the feed-pipes leading from the train-pipe to the interior of each car with the train-pipe I interpose in the train-pipe under each car a cross connection or coupling, as shown in Fig. 9, provided with two ports connecting directly with the train-pipe and two lateral ports opening directly therefrom and connecting directly with the feed-pipes 7. A portion of the interior of this cross connection or coupling is enlarged so as to receive a cylindrical strainer T, which extends longitudinally of the train-pipe and transversely of the ports connecting with the feed-pipes. With this construction I have a free passage for the steam through the train-pipe entirely free from obstructions of every nature and a direct connection with the feed-pipes, with a strainer suitably interposed between the train-pipe and the feed-pipes. To permit the free flow of steam from the train-pipe through the strainer T, I provide the grooves $t$ in the coupling, partially surrounding the strainer T and preferably connecting the feed-pipe ports of the cross-coupling with each other.
The feed-pipes 7 are of such diameter that the body of steam contained therein will afford sufficient heat to prevent clogging or stoppage of said pipes by the freezing of water of condensation, such size serving also to give them sufficient strength for the exigencies of railroad service and for rough usage, to which they are subjected in the exposed position in which they are necessarily located. These feed-pipes lead to the control-valves 9, through which the steam must pass to enter the heating system in the car. Each valve 9 is provided with a diaphragm U, (*vide* Fig. 5,) which is provided with a perforation $u$ for the passage of steam from the feed-pipe 7 into and through the valve 9. (See Fig. 5½.)

Figures 4, 5:
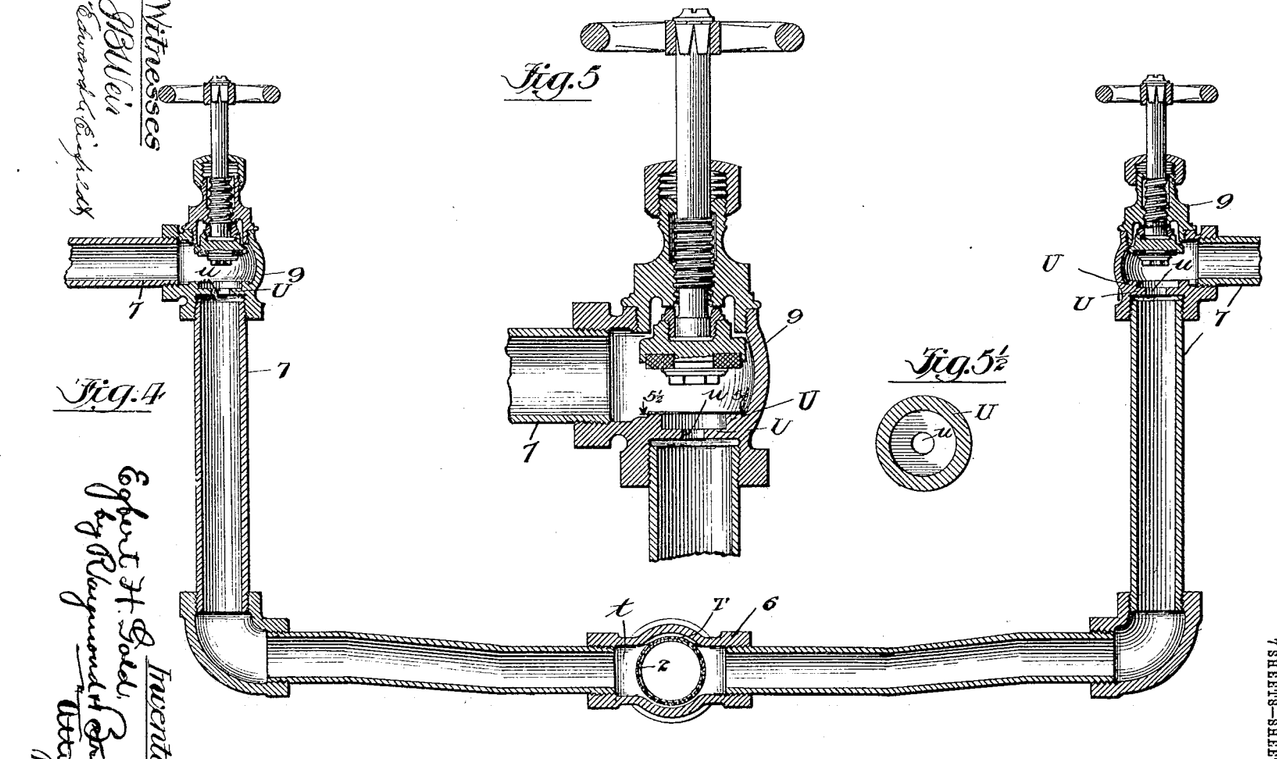
Fig. 4 is an enlarged cross-sectional view showing the application of my strainer-cross and diaphragm-valve.
Fig. 5 is an enlarged sectional detail of my diaphragm-valve.

The valve 9 is preferably located in a sheltered position, such as the interior of the car, where the danger of freezing is reduced to a minimum. The diaphragm U, with its constricted opening $u$, serves to retard the flow of steam from the train-pipe into the heating system in the car, so that the entire length of the train-pipe will be filled with steam at normal pressure before the heating system of any one car of the train shall have been filled with steam. In fact, the ordinary operation will be such that the train-pipe will be filled with steam at normal pressure before any substantial amount of steam will have entered the heating system of any of the cars. Consequently the train-pipe is promptly filled with steam, and steam will promptly appear at the extreme rear end of the train-pipe to indicate that the train-pipe is clear, and there will be no appreciable delay in starting the train on that account. The train-pipe having become filled with steam at normal pressure, steam will then enter the heating system in all of the cars at substantially uniform pressure throughout the entire length of the train, with the result that there will be a substantially uniform heating of the entire train, and so, on the other hand, should the steam-pressure fall in the train-pipe there will be a substantially uniform fall of pressure in the radiator systems of all of the cars of the train and a uniform reduction of temperature throughout the train instead of a progressive cooling of the train from the rearmost car forwardly. The advantage of this operation, which is due wholly to the use of these perforated diaphragm-valves, will be immediately recognized by those familiar with this art and with the practical difficulties encountered therein.

In the operation of coupling and uncoupling cars it will be readily seen that inasmuch as it is impossible to close one of my end valves at the forward end of the car against steam-pressure the flexible couplings between the cars will indicate to the railroad operative by their temperature whether or not live steam is in said couplings, for if the rear valve of the forward car is closed steam cannot enter the flexible hose-sections, and so the sections will cool and their temperature will indicate the fact that steam is shut off therefrom. Furthermore, if a careless operative in hastily closing the valves shall but partially close a valve to shut off the steam the steam-pressure will complete the closing and the valve will be shut tightly. Consequently the valve will be either wide open with a full flow of steam passing into the flexible sections or will be entirely closed, so that no steam will pass into the flexible sections except such as may leak through the bleeding-port. If now with the valve open at the rear end of the forward car the valve at the forward end of the car immediately behind it be closed, the pressure of steam within the flexible hose-sections will throw such valve open and there will be a full body of steam passing through the flexible hose-sections. It will thus be seen that the flexible hose-sections will be either entirely devoid of steam, in which event they will be cold and the operative may disconnect them with full assurance that they are not filled with water of condensation and that he will not thereby throw open the entire train-pipe and cause a wasteful loss of steam as well as a disastrous discharge of steam against himself, or said sections will be filled with a body of live steam at normal pressure, in which event the operative will be fully advised thereof by the temperature of said sections the minute he attempts to manipulate the same. So, also, the features which I have just referred to make it impossible for water of condensation to accumulate in the flexible hose-sections and to obstruct the train-pipe by freezing therein, as may often be the case in the use of other valves, which may be but imperfectly closed, and so allow such a gradual leakage of steam as will but supply water of condensation without furnishing sufficient heat to prevent the freezing thereof, or, as may be the case where through oversight an ordinary valve may be closed at the forward end of a car, so that the flexible hose-sections between that car and the next car forward will constitute the dead end of the train-pipe, into which will be carried the water of condensation because of the movement of the train and because of the steam-pressure in the forward end of the train-pipe.

It will thus be seen that by means of my apparatus and my system as a whole the following important ends are attained: First, the train-pipe can never be closed at the forward end of a car; second, water of condensation cannot accumulate in the hose-sections between cars; third, loss of steam by the inadvertent disconnection of hose-sections filled with water when the train-pipe valve is open is prevented; fourth, an automatic bleeding-valve for the continuous discharge of the water of condensation from the rear end of the train is provided and freezing of the pipe is thus prevented; fifth, the permanent stoppage of the bleeding-port is prevented by automatic means for clearing the bleeding-port of obstructions; sixth, the waste of steam, due to leaving the end valve at the rear of the train partially open when the steam in the train-pipe is at low pressure, is rendered impossible; seventh, a clear passage-way for steam through the train-pipe end valve is afforded when the end valve is open and steam-pressure in the train-pipe serves to hold the valve open; eighth, a convenient means is provided for taking steam from the steam-pipe to the radiator systems of the cars without obstructing the free flow of steam through the train-pipe; ninth, the train-pipe is filled with steam throughout its entire length before the radiator systems of the cars are supplied; tenth, an unobstructed passage is provided throughout the length of the train-pipe and a substantially uniform pressure throughout the train is obtained; eleventh, the gradual admission of steam through the diaphragm-valve 9 permits of the gradual and uniform expansion of the radiating-pipes, thus eliminating the straining of the pipes and consequent leaking thereof, which is due to the sudden filling of the pipes with live steam and is a frequent source of trouble; twelfth, the end-valve-operating lever is mounted in such a manner as to give it great strength and so as to brace it against injury by accident.

It will be understood that I do not limit my invention to the precise embodiment thereof hereinbefore shown and described.

I do not here claim *per se* the valve structure shown, the same being the subject-matter of my copending application, Serial No. 154,775. Neither do I here claim broadly the combination, with a car-heating system, of a throttled feed-valve shown, but reserve the right to cover the same by a divisional application.

I claim—

1. In a car-heating system, the combination with a car of a train-pipe and one-way valves arranged in said train-pipe, one valve being arranged at each end of said car and said valves being adapted to be closed only to prevent the passage of steam from said train-pipe at the rear end of said car.

2. In a car-heating system, the combination with a car of a train-pipe and a valve arranged in said train-pipe at each end of the car, said valves being so arranged as to be opened by the pressure of steam entering the train-pipe at either end and to be held closed by the same steam-pressure, to prevent the passage of steam from either end of the train-pipe, said valves being also so arranged that when moved to the extreme open position they will be held in that position by the pressure of steam passing through said train-pipe.

3. In a car-heating system, the combination with the train-pipe of a valve mounted therein, said valve comprising a main valve adapted to be held to its seat by steam-pressure within the train-pipe, a manually-operated bleeding-valve, and means for holding said bleeding-valve open against pressure in the train-pipe.

4. In a car-heating system, the combination with the train-pipe of a valve mounted therein, said valve comprising a main valve and a bleeding-valve and means for automatically clearing the orifice of said bleeding-valve of obstructions.

5. In a car-heating system, the combination with the train-pipe, of a main valve interposed therein and arranged to be held to its seat by pressure within said train-pipe, said main valve being provided with a bleeding-port therethrough, a bleeding-valve arranged to close said bleeding-port, means for manually operating said bleeding-valve, and a lost-motion connection between said bleeding-valve and said main valve whereby said bleeding-valve may be opened or closed without operating the main valve, while the main valve cannot be manually opened or closed without correspondingly operating the bleeding-valve.

6. In a car-heating system, the combination with the train-pipe of a main valve, arranged to be held to its seat by pressure within said train-pipe, valve-operating means, a bleeding-valve connected with the said operating means and having a lost-motion connection with said main valve and arranged to be opened by the same operation which opens the main valve and means for automatically holding the bleeding-valve open against steam-pressure when the main valve is closed.

7. In a car-heating system, the combination with the train-pipe of a cross-coupling interposed therein, a tubular strainer mounted in said coupling and extending longitudinally of the train-pipe and transversely of the cross-ports through said coupling, said coupling being provided with grooves for the passage of steam from behind said strainer into said cross-ports, and feed-pipes connected with said coupling and leading therefrom to the heating system in the car.

8. In a car-heating system, the combination with a plurality of cars of a train-pipe extending along each car, flexible couplings connecting the train-pipe of each car with the train-pipe of the adjoining car and one-way valves mounted in the train-pipe adjacent to each end of each car, said valves being so arranged as to close only to prevent the passage of steam through the train-pipe from each car, and to automatically open under pressure to admit steam into the train-pipe of each car.

9. In a car-heating system, the combination with a train-pipe, of an end valve comprising a casing connected with said train-pipe and provided with a port located below the longitudinal axis of said train-pipe, a valve arranged to close said port, and a bleeding-port through said valve, substantially as described.

10. In a car-heating system, the combination with a train-pipe, of an end valve comprising a casing connected with said train-pipe, provided with a port located below the longitudinal axis of said train-pipe, a valve arranged to close said port, and a bleeding-port, substantially as described.

11. In a car-heating system, the combination with a train-pipe, of an end valve arranged to be automatically closed from a partially-open position by fluid-pressure within the train-pipe, but to remain unclosed when set in a wide-open position, and external means for manually operating said valve, substantially as described.

12. In a car-heating apparatus, the combination with a train-pipe, of an end valve, said valve comprising a casing provided with a recess on the inside thereof and at one side of the course of the main steam-current therethrough, a spindle extending into said recess and out through said casing, a valve mounted on said spindle and arranged to be thrown back into said recess, said casing being provided on its exterior with an annular shoulder, means for operating said valve, said means comprising a yoke rotatively mounted upon said shoulder and arranged to operatively engage the projecting end of said spindle, said yoke being provided with an operating-handle.

13. In a car-heating apparatus, the combination with a train-pipe, of an end valve, said valve comprising a casing provided with a recess on the inside thereof and at one side of the course of the main steam-current therethrough, a spindle extending into said recess and out through said casing, a valve mounted on said spindle and arranged to be thrown back into said recess, said casing being provided on its exterior with an annular shoulder, means for operating said valve, said means comprising a yoke rotatively mounted upon said shoulder and arranged to operatively engage the projecting end of said spindle, said yoke being provided with an operating-handle and with locking means comprising a locking-pin mounted within a recess in said yoke and arranged to engage said annular shoulder on the valve-casing, and a spring mounted to hold one end of said pin in engagement with said shoulder.

14. In a car-heating system, the combination with a train-pipe of a main valve, a valve-operating mechanism having a lost-motion connection with said main valve, a bleeding-valve arranged to be operated by said main-valve-operating mechanism, all arranged to first open said bleeding-valve and then said main valve, and means, in frictional engagement with said valve-operating mechanism, arranged to automatically hold said bleeding-valve open against steam-pressure, substantially as described.

15. In a car-heating system, the combination with a train-pipe, of an end valve comprising a casing, a main valve, a valve-stem rigidly connected therewith, a bleeding-port, a bleeding-valve having a lost-motion connection with said valve-stem, valve-operating mechanism connected with the bleeding-valve, said valve-operating mechanism being mounted in frictional engagement with a portion of the structure, whereby said bleeding-valve may be held open against steam-pressure.

16. In a car-heating system, the combination with a train-pipe, of an end valve comprising a casing, a main valve, valve-operating mechanism having a lost-motion connection with said main valve and a bleeding-valve arranged to be operated by said valve-operating mechanism without necessarily operating the main valve, said valve-operating mechanism being mounted in frictional engagement with a portion of the structure, whereby the bleeding-valve will be held open against steam-pressure.

17. In a car-heating system, the combination with a train-pipe, of an end valve comprising a casing, a valve seated therein, valve-operating mechanism having a lost-motion connection with said valve, a bleeding-valve arranged to be operated by said valve-operating mechanism without necessarily operating the main valve, and a spindle constituting part of the valve-operating mechanism and so extending through a stuffing-box that the bleeding-valve will be held open against steam-pressure by the friction between said spindle and the stuffing-box.

18. In a car-heating system, the combination with a plurality of cars, of a train-pipe extending along each car, a flexible coupling connecting the train-pipe of one car with the train-pipe of the adjoining car, one-way valves mounted in the train-pipe and adjacent to each end of each car, said valves being so arranged as to be capable of being closed only to prevent the passage of steam through the train-pipe and from the rear end of each car, but automatically opening under pressure to admit steam into the train-pipe at the forward end of each car, said valves being provided with bleeding-ports, a cross-coupling interposed in the train-pipe of each car, a cylindrical strainer mounted within said coupling and extending lengthwise of the train-pipe and transversely of the cross-ports through said coupling, a feed-pipe leading from said coupling to the heating system in each car, a valve connected with said feed-pipe to control the passage of steam therethrough, said valve being provided with a diaphragm extending across the steam-passage therethrough, and said diaphragm being provided with a constricted opening for the passage of steam from the steam-pipe to the radiator system of the car.

19. The combination with a plurality of cars of a train-pipe extending along each car, a coupling connecting the train-pipe of one car with the train-pipe of the adjoining car, one-way valves mounted in the train-pipe and adjacent to each end of the car, said valves being so arranged as to be capable of staying closed only to prevent the passage of steam, from the rear end of each car, through the train-pipe, to automatically open under pressure to admit steam into the train-pipe at the forward end of each car, a coupling interposed in the train-pipe of each car, a feed-pipe leading from said coupling to the radiating system in each car, a valve connected with said feed-pipe to control the passage of steam therethrough, said valve being provided with a diaphragm extending across the steam passage, said diaphragm being provided with a constricted opening for the passage of steam from the feed-pipe to the radiating system in the car.

EGBERT H. GOLD.

Witnesses:
O. R. BARNETT,
M. E. SHIELDS.